Nov. 4, 1930.                    M. MÜLLER                    1,780,627

RUNNING WHEEL OF PASSENGER AERIAL CABLEWAYS

Filed Feb. 21, 1930

Patented Nov. 4, 1930

1,780,627

UNITED STATES PATENT OFFICE

MAX MÜLLER, OF LEIPZIG, GERMANY, ASSIGNOR TO FIRM ADOLF BLEICHERT & CO., A. G., OF LEIPZIG, GERMANY

RUNNING WHEEL OF PASSENGER AERIAL CABLEWAYS

Application filed February 21, 1930, Serial No. 430,211, and in Germany April 4, 1929.

With the object of reducing the wear on the carrying cables of passenger cableways to a minimum, it has recently become customary to provide the wheels of the carriages with rubber rings or linings. Great difficulties have, however, been experienced in attaching the rubber to the wheel bodies, because both the travelling track and the running surfaces of the wheels are comparatively narrow. Any side-slipping of the wheels from the cable can be effectually avoided by suitably grooving the rubber linings, but there is always the risk that the rubber lining itself will shift on the wheel body, because rubber will not adhere satisfactorily to metal. The powers of adherence have certainly been improved by the insertion of a layer of vulcanite between the soft rubber ring and the metal running wheel, this material having the property of furnishing a good binding medium between metal on the one hand, and soft rubber on the other hand.

Figure 1:
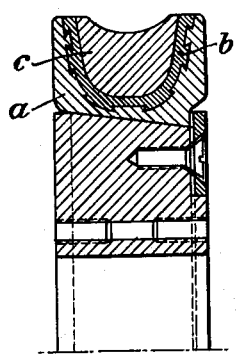

On the annexed drawing, to which reference is made for a complete understanding of my invention, Fig. 1 is a cross-sectional view of a portion of a wheel showing the rubber lining as now employed; Figs. 2–6 are similar views as Fig. 1 showing various modifications of the insertion of a rubber ring in accordance with this invention.

As shown in Fig. 1, the vulcanite $b$ is held in the cast steel rim $a$ by means of swallow-tail grooves, and the soft rubber $c$ is then fitted on this vulcanite. With this system, the rubber will frequently become detached from the metal facing, because the soft rubber will be elastically compressed while running over the cable, and will later, on continuation of the movement, resume its original shape. During every compression, the rubber will be concentrated in the lower part of the cross section of the ring, while the outer parts of the cross-section will simultaneously have a tendency to detach themselves from the walls of the wheel rim. This can be very easily demonstrated by pressing a piece of soft rubber in the middle with the finger. The comparatively high cost constitutes another drawback to this construction, because the metal rim cannot be used again when the rubber lining has worn out.

The present invention constitutes a material improvement in that the rings will not be made initially of the same cross-section as that of the space formed by a metal felloe and side-plates in any given form, in which space the said rings are fitted. The resulting cross-section may be of rectangular or trapezoid form, or it may be given any desired degree of convexity, according to the actual requirements. As a result of this difference in the cross-section of the rubber rings, both before and after assembly (see Figs. 2–6), it will be possible to fit the soft rubber with what may be termed "preliminary tension". If the rubber ring is then loaded by wheel pressure, the outer parts will no longer be able to detach themselves from the raised sides ($g$) of the wheel-rim, and the formation of a gap between the said raised sides and the rubber will be effectually prevented.

Figure 2:
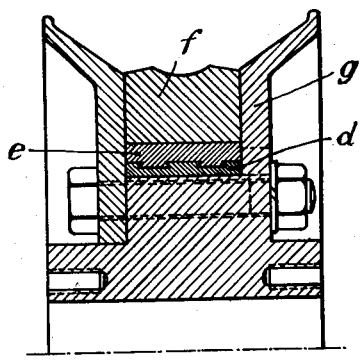
Figure 3:
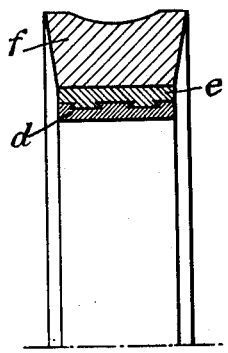
Figure 4:
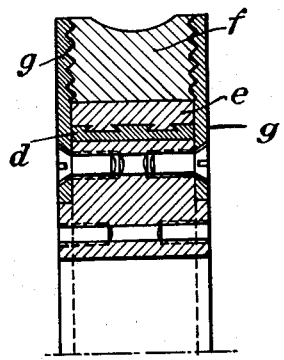

In the embodiment of the invention shown in Fig. 2 the vulcanite $e$ is fixed on the felloe $d$ and then the soft rubber ring $f$ with trapezoid cross-section (Fig. 3) on the vulcanite. This rubber ring will be pressed by the raised sides $g$ of the wheel-rim into rectangular shape. The raised sides will be advantageously provided with grooves (Fig. 4). They are fastened to the wheel body by screws and are reciprocally pressed together, or against the interposed rubber.

Figure 5:
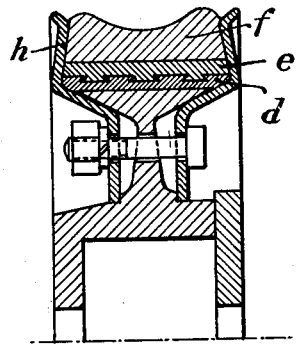
Figure 6:
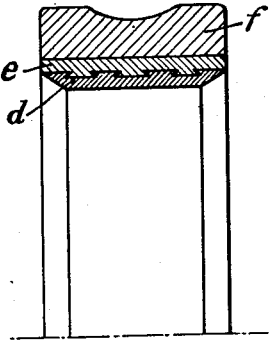

In Fig. 5, the vulcanite layer $e$ is also fitted on the felloe $d$, though the soft rubber ring $f$ is, in this case, of rectangular cross-section (Fig. 6), and it will be pressed together into a trapezoid cross-section by the suitably formed raised sides $h$. The resulting advantages are identical with those already described.

I claim:

1. In a carriage roller for wire cableways, the combination with the outer rim, of a rubber ring made of different shape and dimensions as the space between the sides of said rim adapted to receive said rubber ring.

2. In a carriage roller for wire cableways, the combination with the outer rim having a space of rectangular cross-section between its sides, of a rubber ring of trapezoidal cross-section adapted to be received in said space.

3. In a carriage roller for wire cableways, the combination with the outer rim having a space of trapezoidal cross-section between its sides, a rubber ring adapted to be received in said space and being of rectangular cross-section.

4. In a carriage roller for wire cableways, the combination with the outer rim, of an elastic annular member adapted to be received in the space between the sides of said rim and being of different cross-section from said space.

5. In a carriage roller for wire cableways, the combination with the outer rim, of an elastic annular member adapted to be received in the space between the sides of said rim and being of larger dimensions than said space.

6. In a carriage roller for wire cableways, sidewalls provided along the rim of said roller forming an annular space, and an annular elastic member adapted to be received in said space and of different cross-section therefrom so as to be compressed by said side-walls.

In testimony whereof I affix my signature.

MAX MÜLLER.